United States Patent Office 3,218,305
Patented Nov. 16, 1965

3,218,305
ACCELERATED ANAEROBIC COMPOSITIONS
AND METHOD OF USING SAME
Vernon K. Krieble, Hartford, Conn., assignor to Loctite Corporation, Newington, Conn., a corporation of Connecticut
No Drawing. Filed Dec. 26, 1963, Ser. No. 333,743
19 Claims. (Cl. 260—89.5)

The present invention relates to polymerizable compositions and more particularly to sealant compositions for bonding adjacent surfaces, which compositions contain polymerizable esters and exhibit anaerobic curing characteristics; that is, the ability of the compositions to remain in the liquid, unpolymerized state so long as contact with air or oxygen is maintained while at the same time being capable of rapid and spontaneous polymerization to the solid state upon the exclusion of air or oxygen.

A principal object of the present invention is to provide a new and improved anaerobic curing composition which may be stored as a liquid even though fully compounded long prior to use, yet when confined will cure at a much faster rate than has been experienced heretofore.

An additional object of the present invention is to provide as a storable liquid an improved anaerobic curing composition which at ambient temperatures forms a strong and secure bond between adjacent surfaces within a matter of minutes.

In United States Patent No. 2,895,950 there is disclosed an anaerobic curing composition which polymerizes to the solid state upon the exclusion of air from the composition and which is comprised of certain organic hydroperoxide catalysts and polyacrylate ester monomers. That patent additionally states that conventional accelerators such as tertiary amines, ascorbic acid, organic phosphites and quarternary ammonium salts may be included to reduce the amount of hydroperoxide catalyst required or to enable the use of catalysts having a lesser percentage of oxygenation.

More recently in my United States Patent No. 3,046,262, I have disclosed anaerobic curing compositions which include imide accelerators and preferably organic sulfimides. Those compositions were found to exhibit good shelf-stability and to give strong bonds at room temperature when allowed to cure for an hour or more. My patent further discloses that conventional amine accelerators in combination with formamide and succinimide provided increased activity but that amines should be excluded from sulfimide formulations if shelf-stability is desired.

According to the present invention I have now found that anaerobic curing compositions comprised of monomers, hydroperoxide catalysts including hydrogen peroxide, and sulfimides cam be greatly accelerated without loss in shelf-stability by the addition of small amounts of a certain class of stabilizer together with particular organic amines. The use of these additional components now makes it possible not only to expand the scope of the monomeric materials utilized but also to premix the composition considerably in advance of use. However, more importantly, it is now additionally possible to provide a storable liquid which will cure at room temperature and form a strong bond in a matter of only a few minutes as contrasted with the longer room temperature curing times required heretofore.

According to the present invention it is possible to impart anaerobic curing characteristics to polymerizable polyacrylate esters and more particularly to those compounds having the following general formula:

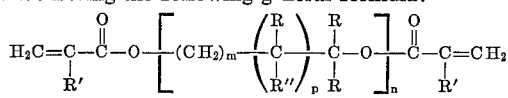

wherein R represents a radical selected from the group consisting of hydrogen, lower alkyl of 1–4 carbon atoms, inclusive, hydroxy alkyl of 1–4 carbon atoms inclusive, and

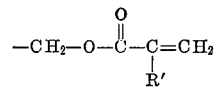

R' is a radical selected from the group consisting of hydrogen, halogen, and lower alkyl of 1–4 carbon atoms; R" is a radical selected from the group consisting of hydrogen, —OH and

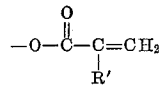

$m$ is an integer equal to at least 1, e.g., from 1 to 8 or higher, for instance, from 1 to 4 inclusive; $n$ is an integer equal to at least 1, for example, 1 to 20 or more; and $p$ is one of the following: 0, 1.

The polymerizable polyacrylate esters utilized in accordance with the invention and corresponding to the above general formula are exemplified by but not restricted to the following materials: diethylene glycol dimethacrylate, triethylene glycol dimethacrylate, tetraethylene glycol dimethacrylate, dipropylene glycol dimethacrylate, polyethylene glycol dimethacrylate, di-(pentamethylene glycol) dimethacrylate, tetraethylene glycol diacrylate, tetraethylene glycol di(chloroacrylate), diglycerol diacrylate, diglycerol tetramethacrylate, tetramethylene dimethacrylate, ethylene dimethacrylate, neopentyl glycol diacrylate and trimethylol propane triacrylate. The foregoing monomers need not be in the pure state, but may comprise commercial grades in which inhibitors or stabilizers are included. As used herein the term "polymerizable polyacrylate ester" includes not only the foregoing monomers in the pure and impure state, but also those other compositions which contain those monomers in amounts sufficient to impart to the compositions anaerobic curing characteristics, exemplary of which is the commercial b-hydroxyethyl methacrylate of Table 4. It is also within the scope of the present invention to obtain modified characteristics for the cured composition by the utilization of one or more monomers within the above formula with other unsaturated monomers such as unsaturated hydrocarbons or unsaturated esters.

In the aforementioned United States Patent No. 2,895,950 there is described and claimed anaerobic curing compositions having the desired air-stability by the use of certain nonpolymerizing organic hydroperoxides, which hydroperoxides are characterized by the fact that the atoms directly linked to the carbon atom bearing the hydroperoxide radical are selected from the group consisting of carbon, hydrogen, nitrogen or oxygen, and, in such cases where all of the said directly linked atoms are carbon, not more than two of said carbon atoms comprise the carbon atom of a methyl group. Some of these hydroperoxide catalysts may be produced readily by direct substitution, and others are produced by oxygenation of compounds in the liquid phase, particularly by passing oxygen or an oxygen-containing gas through the compounds, preferably ethers, ketones and hydrocarbons. The mixture of these catalysts with the monomer is highly sensitive to contact with air so that the catalyst remains inactive or ineffective in the presence of oxygen, but upon exclusion therefrom will initiate polymerization of the monomer. Further details concerning the preparation and specific examples of such hydroperoxide catalysts can be readily obtained from the specification of the aforementioned patent.

In addition to the organic hydroperoxide catalysts defined in that patent, it has been found that the present invention additionally enables the utilization of a broadened class of hydroperoxide catalysts including organic peroxides and hydrogen peroxide for the preparation of anaerobic curing compositions having the characteristic of stability in the presence of air at ambient temperatures for extended periods of time. Although the peroxide catalysts preferably utilized are those generally categorized as hydroperoxides, it has been found unexpectedly that readily hydrolyzable peresters, such as t-butyl perbenzoate may also be used. Such peresters are believed to form hydroperoxides in situ, which hydroperoxides are considered to be within the scope of the present invention.

Although as little as .01 percent of catalyst can be employed, it is preferable to utilize about 1 to 10 percent by weight of the catalyst for optimum speed in curing as well as long storage characteristics. Amounts in excess of 15 percent by weight produce no additional beneficial effect and, in fact, have a tendency to act as a diluent for the cured composition.

It has been unexpectedly found in accordance with the present invention that only those compositions containing organic sulfimides will exhibit the improved curing and storage properties desired. This is more clearly shown in Example 6 wherein several different imides were tested under identical conditions yet only the composition containing the sulfimide produces rapid curing characteristics. Additionally, carboxylic acids, such as ascorbic acid, acrylic or methacrylic acid and those acids disclosed in United States Patent No. 2,833,753, e.g., chloroacetic acid, when used in place of the sulfimide are ineffective in that they either do not exhibit fast curing speeds or have the effect of destroying the shelf-stability thereby rendering the composition impractical for commercial application.

Among the sulfimides that can be beneficially employed, benzoic sulfimide has proven most useful in that it provides not only optimum acceleration but also good shelf-stability. The sulfimides have been found to be effective in trace amounts, e.g., 0.01 percent, or in amounts up to saturation; however, generally about 0.05 to 10.0 percent by weight is utilized with a preferred range being from 0.1 to 2.0 percent by weight.

The remarkably increased curing speeds are obtained according to the present invention from compositions which contain, in addition to the monomer, catalyst and sulfimide, minor amounts of a certain class of stabilizers together with particular organic amines. The amounts of stabilizer and amine necessary for producing these fast cures will of course vary depending on the particular materials utilized. However, it has been found that generally the amount of stabilizer varies in proportion to the amount of amine thus permitting as a further advantage of the invention the premixing of these two components regardless of the characteristics of the basic sealant composition.

Although the quinones are the preferred materials within the class of workable stabilizers, it has been additionally found that sterically hindered monohydric and polyhydric phenols may also be utilized. The groups effecting the steric hindrance are generally alkyl groups of at least 2 carbon atoms, such as a tertiary butyl or isopropyl radical, and are usually located in the ortho position to the hydroxy group of the phenol. When materials, such as hydroquinone, which are not sterically hindered are utilized, the desired shelf-stability is not obtained.

While the benzoquinones are the preferred members of the quinone series for use in the invention, the naphthoquinones, phenanthraquinones and anthraquinones may also be used. Of these, the p-quinones, for example, 1,4-benzoquinone and 2,5-dihydroxy p-benzoquinone, have proved most effective and are preferred due to their ability to readily admix with the sealant composition. The quinones and sterically hindered phenols are easily incorporated in the sealant composition by dissolving them in a portion of the monomer or in a small amount of inert solvent, after which the solution containing the stabilizer is added to the sealant composition.

As mentioned heretofore the amount of stabilizer will vary in proportion to the amount of amine added. However, according to the present invention it has been found unexpectedly that concentrations of the stabilizer beyond the amounts normally used for stabilization of commercial monomers frequently increase the curing speed as well as the shelf-stability of the composition. An effective range for the stabilizer is from about 10 parts per million to about 1000 parts per million for an amine content of about 0.01–3.0 percent. Generally it has been found that commercial grades of basic sealant composition will utilize from 25 to 800 parts per million, with the preferred range being from 200 to 600 parts per million as the amount of amine increased from about 0.1–1.0 percent.

Indicative of the general parallelism between the amounts of stabilizer and amine employed are the figures given in Table 1 covering an effective concentration range for 1,4 benzoquinone and N,N dimethyl p-toluidine:

TABLE 1

| Material | Concentrations in the Monomer | | | | |
|---|---|---|---|---|---|
| Stabilizer, p.p.m | 10 | 100 | 200 | 400 | 600 |
| Amine, percent | 0.01 | 0.1 | 0.25 | 0.5 | 0.75 |

According to the present invention the amines found to be effective in producing the accelerated cure are particular tertiary and secondary organic amines. The tertiary amines found to be effective according to the invention are the tertiary N,N-dialkyl aryl amines which may be represented by the following general formula:

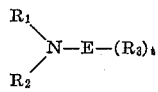

wherein E represents a carbocyclic aromatic nucleus selected from the group consisting of phenyl and naphthyl radicals; $R_1$ and $R_2$ are lower alkyl radicals of 1 to 4 carbon atoms, inclusive; $t$ is one of the following: 0, integer equal to from 1 to 5 inclusive; and $R_3$ is a member selected from the groups consisting of lower alkyl and lower alkoxy radicals of 1 to 4 carbon atoms inclusive, provided that when an $R_3$ radical is in the ortho position $t$ is greater than 1.

Additionally I have found that heterocyclic secondary amines, particularly those amines wherein the heterocyclic ring is hydrogenated, may be used as the amine component with good success. Typical of such hydrogenated or saturated heterocyclic compounds are pyrrolidine, piperazine and 1,2,3,4-tetrahydroquinoline.

The amount of amine preferably employed will vary depending not only upon the particular amine selected but also upon the activity and stability of the basic sealant composition. In general, the amount of amine required to produce the desirable fast speeds may be as little as 0.01 percent by weight of the monomer or as high as about 3.0 percent by weight. For most compositions a range of 0.05 to 1.0 percent is used with good results; however, the preferred range is from 0.1 to 0.75 percent by weight of the monomer.

The composition of the present invention may be mixed at ambient temperatures for periods of months and even years prior to actual use and stored for such periods at room temperature without any evidence of gelling. It is only necessary that there be present a moderate amount of air or oxygen which is provided conveniently by a small volume of air in a properly shaped container, preferably of polyethylene or a similar material which is air permeable. However, upon exclusion from air by placement between adjacent surfaces, the sealant composition will rapidly polymerize to form a strong bond, which polymerization can be further accelerated by use of elevated temperatures, although it is an advantage of the present invention that such elevated temperatures are not necessary since these compositions produce strong bonds within a matter of minutes.

Because of the efficacy of these sealant compositions, only small amounts are necessary to bond mating surfaces, and a few drops of the composition will suffice for bonding the cooperating threads of a nut and bolt. The surfaces to which the sealant is to be applied should be free from grease or contamination prior to application. When used on softer metals, such as aluminum and copper, or when the engagement ratio between the members to be joined is high, it may be desirable to reduce the shear strength produced by the sealant mixture through the incorporation of compatible diluents.

The compositions are nonvolatile and may be varied in viscosity by means of the particular monomer selected and by use of thickening agents. It is generally desirable to have a thin liquid of low viscosity having good capillary action for purposes of bonding closely fitting surfaces or for bonding previously assembled parts by penetration of the sealant composition between the mating surfaces. In bonding loose fitting surfaces or for filling large spaces or voids, high viscosity sealant compositions are preferable.

The sealant compositions may be applied dropwise and allowed to penetrate between adjacent surfaces through capillary action or the parts may be precoated in tumbling, spraying or dipping operations. Most metals will catalyze the cure of the sealant compositions; however, certain metals such as cadmium and zinc do not exhibit the catalytic speed of other metal surfaces and it is preferred to treat one or both of the mating surfaces with a heavy metal compound which is soluble in the sealant mixture, such as ferric chloride, cobalt, manganese, lead, copper and iron soaps.

To determine the long term or shelf-stability of the sealant compositions, a simple but effective test has been developed. The sealant is placed in suitable containers, such as test tubes, which are then placed in a temperature controlled environment, such as a water bath maintained at 82±1° C. At the end of predetermined intervals, generally ten minutes or less, a glass rod is dropped into the sealant. If the rod strikes the bottom of the test tube the composition has not gelled. When the viscosity of the gelling sealant prevents the rod from striking the bottom, the time is noted. It has been found that a sealant still free from gelling for thirty minutes or more during this accelerated heat aging test will be free from gelling at ambient temperatures in the presence of oxygen for at least one year, which is the commercially desirable minimum shelf life.

To test the activity of the sealant composition of the present invention, simple tests are available. For one test, several drops of the sealant mixture are placed between two elongated plates of glass or metal or combinations thereof, preferably at right angles to each other. When it is possible to move the two plates as a unit by manipulating one of the plates it is evident that polymerization has taken place. In general, such a degree of polymerization within several hours had been previously considered satisfactory for most purposes, although longer periods were permissible for some applications where bond strength is not required immediately. However, according to the present invention this degree of polymerization should take place within about thirty minutes and preferably within five to fifteen minutes.

In another and preferred test for activity, the strength of the bond between threaded members is determined by placing several drops of the sealant on the mating threads of a nut and bolt, tightening the nut to a predetermined torque, and allowing the sealant to set and cure, generally at room temperature. In some instances, the break-loose torque is noted, but conventionally the prevailing torque is the measure of bond strength. To obtain the prevailing torque for the bond, the torque required to turn the bolt or screw at several, usually four or five, points after the break-loose torque and up to one full turn are averaged. For example, the torques required at ¼, ½, ¾ and 1 turn are taken and averaged. Commercially, a bolt sealant developing a prevailing torque of one foot pound on ⅜ inch full nuts is considered satisfactory.

The following examples are given in order that the effectiveness of the present invention may be more fully understood. These examples are set forth for the purpose of illustration only and are not intended to in any way limit the practice of the invention. Unless otherwise specified, all parts are given by weight.

*Example 1*

A formulation was prepared from 30 cc. of a commercial grade of tetraethylene glycol dimethacrylate, 2% of cumene hydroperoxide (dimethyl benzyl hydroperoxide) and 0.5% of benzoic sulfimide. The formulation was stirred until homogeneous and divided into three equal portions. The first portion was labeled Sample 1. Into the second portion was mixed 0.5% of N,N-dimethyl p-toluidine and 400 p.p.m. of 1,4 benzoquinone, while to the third portion was added 1.0% of N,N-dimethyl p-toluidine and 600 p.p.m. of 1,4 benzoquinone. The second and third portions, as modified, were labeled Samples 2 and 3, respectively. Portions of all three samples were subjected to the heat aging stability test at 82° C. for thirty minutes while the speeds of the respective samples were determined by placing a few drops of the formulations on the threads of ⅜ inch nuts and bolts, assembling them and allowing them to stand at room temperature for the indicated time intervals, at which time the prevailing torques were measured. The test results are set forth in Table 2.

TABLE 2

| Sample No. | Stability (min.) | Prevailing Torque (ft. lbs.) | | |
|---|---|---|---|---|
| | | 10 min. | 15 min. | 30 min. |
| 1 | 30+ | 0 | 0 | 0 |
| 2 | 30+ | 10 | 16 | 22 |
| 3 | 30+ | 11 | 13 | 25 |

*Example 2*

To 9 cc. of triethylene glycol dimethacrylate was added 0.5% of benzoic sulfimide, 2% of cumene hydroperoxide, one gram of a copolymer of 80% styrene and 20% acrylate having a molecular weight of about 30,000, 3.0% of acrylic acid and 50 p.p.m. of 1,4 benzoquinone. This formulation was thoroughly mixed and tested for stability and speed in the same manner as in Example 1. The tests indicated a stability of 26 minutes and a prevailing torque at 1, 2 and 4 hours of 0, 7 and 20 foot pounds, respectively.

A formulation identical with that of the preceding paragraph was mixed and modified by adding 0.5% of N,N-dimethyl p-toluidine and 600 p.p.m. of 1,4 benzoquinone. The modified formulation gave a stability of 27 minutes and a prevailing torque at 10, 15, 30 and 60 minutes of 0, 8, 19 and 24 foot pounds, respectively.

As is readily apparent from these examples, a substantial increase in speed is effected according to the present invention while maintaining good storage properties.

*Example 3*

To illustrate the effect on the speed of cure of the composition by varying the concentrations of both the amine and the quinone, a commercial formulation was prepared utilizing tetraethylene glycol dimethacrylate, 2% of cumene hydroperoxide and 0.3% of benzoic sulfimide. To portions of this formulation were added varying amounts of N,N-dimethyl p-toluidine and 1,4 benzoquinone. The resultant samples were tested for stability and speed of cure, and the test data is reported in Table 3 below.

TABLE 3

| Sample No. | Concentrations | | Stability (min.) | Prevailing Torque (ft. lbs.) | | |
|---|---|---|---|---|---|---|
| | Amine (percent) | Quinone (p.p.m.) | | 10 min. | 15 min. | 30 min. |
| 1 | 0.2 | 400 | 30+ | 5 | 8 | 14 |
| 2 | 0.2 | 600 | 30+ | 1 | 4 | 11 |
| 3 | 0.5 | 400 | 30+ | 12 | 21 | 13 |
| 4 | 0.5 | 600 | 30+ | 4 | 18 | 15 |
| 5 | 0.75 | 400 | 30+ | 14 | 19 | 16 |
| 6 | 0.75 | 600 | 30+ | 9 | 13 | 19 |
| 7 | 1.0 | 400 | 30+ | 12 | 21 | 18 |
| 8 | 1.0 | 600 | 30+ | 10 | 15 | 17 |

*Example 4*

This example illustrates the efficacy of different monomers in producing fast cures. To 50 cc. of each of the monomers listed in Table 4 was added 1 cc. of cumene hydroperoxide, 0.1 gram of benzoic sulfimide, 0.25 cc. of a 10% solution of 1,4 benzoquinone in the respective monomer (500 p.p.m.) and the amount of N,N-dimethyl p-toluidine indicated in the table. The prevailing torques of the resultant formulations are tabulated in Table 4.

TABLE 4

| Monomer | Amine (Percent) | Prevailing Torque (ft. lbs.) | | |
|---|---|---|---|---|
| | | 10 min. | 15 min. | 30 min. |
| Tetraethylene glycol dimethacrylate | 1.0 | 6 | 15 | 22 |
| Triethylene glycol dimethacrylate | 1.0 | 3 | 14 | 21 |
| Trimethylol propane triacrylate | 0.5 | 8 | 13 | 28 |
| Triethylene glycol diacrylate | 0.5 | 15 | 19 | 20 |
| 1,4-butane diacrylate | 0.5 | 5 | 11 | 12 |
| Ethylene glycol dimethacrylate | 1.0 | 1 | 6 | 11 |
| b-Hydroxyethyl methacrylate | 0.5 | 0 | 0 | 7 |
| Methyl methacrylate | 0.5 | 0 | 0 | 0 |
| Stearyl methacrylate | 0.5 | 0 | 0 | 0 |
| Ethyl acrylate | 1.0 | 0 | 0 | 0 |
| 2-methoxy ethyl acrylate | 0.5 | 0 | 0 | 0 |

*Example 5*

As an illustration of the various organic hydroperoxide catalysts utilizable in producing fast cures, 50 cc. samples of tetraethylene glycol dimethacrylate were mixed with 0.1 gram of benzoic sulfimide, 0.25 cc. of N,N-dimethyl p-toluidine and 0.25 cc. of a 10% solution of 1,4 benzoquinone in tetraethylene glycol dimethacrylate. To each sample was added the designated amount of peroxide catalyst. The speed of cure was measured on ⅜ inch nuts and bolts and the stability of each sample determined.

TABLE 5

| Sample | Catalyst | Amount | Stability | Prevailing Torque (ft. lbs.) | | |
|---|---|---|---|---|---|---|
| | | | | 10 min. | 15 min. | 30 min. |
| 1 | None | | 30+ | 0 | 0 | 0 |
| 2 | Cumene hydroperoxide | 1 cc | 30+ | 7 | 11 | 15 |
| 3 | Methyl ethyl ketone hydroperoxide | 1 cc | 30+ | 7 | 12 | 15 |
| 4 | Diisopropyl benzene hydroperoxide | 1 cc | 30+ | 2 | 5 | 10 |
| 5 | t-Butyl hydroperoxide | 1 cc | 30+ | 0 | 4 | 6 |
| 6 | 2,5-dimethyl hexane-2,5-dihydroperoxide | 1 gm | 30+ | 0 | 0 | 5 |
| 7 | t-Butyl perbenzoate [1] | 1 cc | 12 | 2 | 13 | 24 |
| 8 | t-Butyl perbenzoate [2] | 1 cc | 5 | 0 | 0 | 18 |
| 9 [3] | t-Butyl perbenzoate | 1 cc | | 0 | 7 | |
| 10 | Di-t-butyl peroxide | 1 cc | 30+ | 0 | 0 | 0 |
| 11 | Dicumyl peroxide | 1 gm | 30+ | 0 | 0 | 0 |
| 12 | 2,5-dimethyl hexane-2,5-di-t-butyl peroxide | 1 cc | 30+ | 0 | 0 | 0 |
| 13 | Benzoyl peroxide [4] | 1 gm | 0 | | | |

[1] Material was used as obtained from supplier.
[2] Material was scrubbed with 3% of NH$_4$OH to remove any hydroperoxide impurity.
[3] Same as Sample 8 after allowing material to stand for two days.
[4] Reacted violently with evolution of heat immediately upon mixing thus not permitting a test for speed of cure.

*Example 6*

Additional samples were prepared using the same monomer, amine and quinone as in Example 5 in the same amounts as in Example 5 and additionally adding 1 cc. of cumene hydroperoxide in each sample. The speed of cure and stability of these samples were tested when various imides and carboxylic acids were substituted for the preferred sulfimides of the invention. The results are tabulated in Table 6.

TABLE 6

| Sample | Component Imide or Acid | Amount | Stability | Prevailing Torque (ft. lbs.) | | |
|---|---|---|---|---|---|---|
| | | | | 10 min. | 15 min. | 30 min. |
| 1 | None | | 30+ | 0 | 0 | 0 |
| 2 | Benzoic sulfimide | 0.1 gm | 30+ | 7 | 11 | 15 |
| 3 | Succinimide | 0.1 gm | 30+ | 0 | 0 | 0 |
| 4 | N-ethyl acetamide | 0.1 cc | 30+ | 0 | 0 | 0 |
| 5 | Ascorbic acid | 0.1 gm | 3 | 2.5 | 4 | 8 |
| 6 | Methacrylic acid | 0.1 cc | 30+ | 0 | 0 | 0 |
| 7 | Acrylic acid | 0.1 cc | 30+ | 0 | 0 | 0 |
| 8 | Chloracetic acid | 0.1 gm | 30+ | 0 | 0 | 0 |

*Example 7*

To each of three 50 cc. samples of tetraethylene glycol dimethacrylate was added 400 p.p.m. of 1,4 benzoquinone, 0.5 percent of N,N-dimethyl p-toluidine, and the indicated amounts of benzoic sulfimide and cumene hydroperoxide catalysts. The speed of cure for the three samples is set forth in Table 7.

TABLE 7

| Sample No. | Amount | | Prevailing Torque (ft. lbs.) | | |
|---|---|---|---|---|---|
| | Imide, percent | Catalyst, percent | 10 min. | 15 min. | 30 min. |
| 1 | 0.3 | 2 | 6 | 16 | 21 |
| 2 | (¹) | 2 | 25 | 29 | 25 |
| 3 | 0.3 | 8 | 13 | 10 | 23 |

¹ Saturated solution of imide in monomer.

*Example 8*

This example illustrates the speeds obtained from various compositions when the amine component is varied.

Admixed with 50 cc. samples of a commercial grade of tetraethylene glycol dimethacrylate were 2% of cumene hydroperoxide, 0.5% of benzoic sulfimide, 400 p.p.m. of 1,4 benzoquinone and about 0.5% of the different amines designated in Table 8. All samples had acceptable stabilities.

TABLE 8

| Sample | Amine | Prevailing Torque (ft. lbs.) | | |
|---|---|---|---|---|
| | | 10 min. | 15 min. | 30 min. |
| 1 | None | 0 | 0 | 0 |
| 2 | 1,2,3,4-tetrahydro quinoline | 9 | 24 | 26 |
| 3 | Pyrrolidine | 5 | 8 | 18 |
| 4 | N,N-dimethyl m-toluidine | 2 | 11 | 16 |
| 5 | Piperazine | 0.25 | 0.5 | 3 |
| 6 | N,N-dimethyl aniline | 0 | 0 | 12 |
| 7 | N,N-diethyl m-phenetidine | 0 | 0 | 11 |
| 8 | N,N-diethyl 2,4-dimethyl aniline | 0 | 0 | 11 |
| 9 | N,N-dimethyl naphthylamine | 0 | 0 | 2 |
| 10 | N,N-diethyl 2,5-dimethyl-aniline | 0 | 0 | 1 |
| 11 | N,N-dimethyl o-toluidine | 0 | 0 | 0 |
| 12 | N-ethyl, diphenylamine | 0 | 0 | 0 |
| 13 | Triphenylamine | 0 | 0 | 0 |
| 14 | N,N-dimethyl p-nitroaniline | 0 | 0 | 0 |
| 15 | N,N-diethyl p-chloroaniline | 0 | 0 | 0 |

*Example 9*

To 50 cc. portions of tetraethylene glycol dimethacrylate was added 1 cc. of cumene hydroperoxide, 0.15 cc. of benzoic sulfimide, 0.2 cc. of N,N-dimethyl p-toluidine and 0.2 cc. of a 10% solution of the indicated inhibitor in tetraethylene glycol dimethacrylate. The formulations were tested for stability and speed and the results are tabulated below:

TABLE 9

| Inhibitor | Stability | Prevailing Torque (ft. lbs.) | | |
|---|---|---|---|---|
| | | 10 min. | 15 min. | 30 min. |
| Hydroquinone | 7 | 5 | 14 | 22 |
| 1,4 benzoquinone | 30+ | 14 | 14 | 22 |
| 2,5 ditertiary butyl hydroquinone | 30+ | 20 | 22 | 25 |
| 2,6 ditertiary butyl p-cresol | 12 | 12 | 19 | 26 |

It will be apparent and understood that various modifications and equivalents within the realm of my invention may be used and I intend to include these within the scope of the appended claims.

I claim:

1. A storable liquid sealant composition having extended shelf life in the presence of oxygen and being capable of rapidly polymerizing upon the exclusion of oxygen comprising in admixture a polymerizable polyacrylate ester monomer; .01–15.0 percent by weight of a hydroperoxide catalyst, said catalyst being characterized by its ability to remain ineffective to polymerize said monomer in the presence of oxygen and to initiate polymerization of said monomer in the absence of oxygen; 0.01–10.0 percent by weight of an organic sulfimide; an inhibitor selected from the group consisting of quinones and monohydric and dihydric phenols having at least one alkyl group ortho to each hydroxy group thereof; and an amine selected from the group consisting of heterocyclic secondary amines wherein the heterocyclic ring is hydrogenated, N,N-dialkyl aryl amines and N,N-dialkyl substituted aryl amines wherein the substituents are selected from the group consisting of lower alkyl radicals of 1 to 4 carbon atoms, the number of said substituents being at least two when one of said substituents is in the ortho position, said inhibitor and said amine being present in amounts equal to 10–1000 parts per million and 0.01–3.0 percent by weight, respectively.

2. A storable liquid sealant composition having extended shelf life in the presence of oxygen and being capable of rapidly polymerizing upon the exclusion of oxygen comprising in admixture a polmerizable polyacrylate ester monomer; .01–15.0 percent by weight of a hydroperoxide catalyst, said catalyst being characterized by its ability to remain ineffective to polymerize said monomer in the presence of oxygen and to initiate polymerization of said monomer in the absence of oxygen; 0.01–10.0 per cent by weight of an organic sulfimide; 10–1000 parts per million of an inhibitor selected from the group consisting of quinones and monohydric and dihydric phenols having at least one alkyl group ortho to each hydroxy group thereof; and 0.01–3.0 percent by weight of an amine corresponding to the general formula:

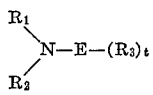

wherein E represents a carbocyclic aromatic nucleus selected from the group consisting of phenyl and naphthyl radicals, $R_1$ and $R_2$ are lower alkyl radicals of 1 to 4 carbon atoms inclusive, $t$ is one of the following: 0, an integer equal to from 1 to 5 inclusive, and $R_3$ is a member selected from the group consisting of lower alkyl radicals of 1 to 4 carbon atoms inclusive, provided that when an $R_3$ radical is in the ortho position $t$ is greater than one.

3. A storable liquid sealant composition having extended shelf life in the presence of oxygen and being capable of rapidly polymerizing upon the exclusion of oxygen comprising in admixture a polymerizable polyacrylate ester monomer; .01–15.0 percent by weight of a hydroperoxide catalyst, said catalyst being characterized by its ability to remain ineffective to polymerize said monomer in the presence of oxygen and to initiate polymerization of said monomer in the absence of oxygen; 0.01–10.0 percent by weight of an organic sulfimide, a quinone in an amount equal to 10–1000 parts per million and 0.01–3.0 percent by weight of a heterocyclic secondary amine selected from the group consisting of pyrrolidine, piperazine and 1,2,3,4-tetrahydroquinoline.

4. A storable liquid sealant composition having extended shelf life in the presence of oxygen and being capable of rapidly polymerizing upon the exclusion of oxygen comprising in admixture a monomer corresponding to the general formula:

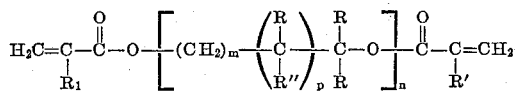

wherein R is a member selected from the group consisting of hydrogen, lower alkyl of 1–4 carbon atoms, hydroxy alkyl of 1–4 carbon atoms, and

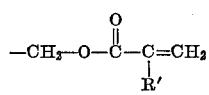

R' is a member selected from the group consisting of hydrogen, halogen, and lower alkyl of 1–4 carbon atoms, R" is a member selected from the group consisting of hydrogen, —OH and

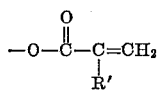

$m$ is an integer equal to at least 1, $n$ is an integer equal to at least 1 and $p$ is one of the following: 0, 1; .01–15.0 percent by weight of a hydroperoxide catalyst, said catalyst being characterized by its ability to remain ineffective to polymerize said monomer in the presence of oxygen and to initiate polymerization of said monomer in the absence of oxygen; 0.01–10.0 percent by weight of an organic sulfimide; an inhibitor selected from the group consisting of quinones and monohydric and dihydric phenols having at least one alkyl group ortho to each hydroxy group thereof; and an amine selected from the group consisting of heterocyclic secondary amines wherein the heterocyclic ring is hydrogenated, N,N-dialkyl aryl amines and N,N-dialkyl substituted aryl amines wherein the substituents are selected from the group consisting of lower alkyl radicals of 1 to 4 carbon atoms, the number of said substituents being at least two when one of said substituents is in the ortho position, said inhibitor and said amine being present in amounts equal to 10–1000 parts per million and 0.01–3.0 percent by weight, respectively.

5. A storable liquid sealant composition in accordance with claim 1 wherein the catalyst is an organic hydroperoxide.

6. A storable liquid sealant composition in accordance with claim 1 wherein the amine is said N,N-dialkyl substituted aryl amine.

7. A storable liquid sealant composition in accordance with claim 1 wherein the catalyst is cumene hydroperoxide and the organic sulfimide is benzoic sulfimide.

8. A storable liquid sealant composition in accordance with claim 2 wherein the quinone is a benzoquinone and the integer $t$ in the formula of the amine is equal to one.

9. A storable liquid sealant composition in accordance with claim 2 wherein the amine is N,N-dimethyl p-toluidine.

10. A storable liquid sealant composition in accordance with claim 3 wherein the monomer comprises tetraethylene glycol dimethacrylate.

11. A storable liquid sealant composition in accordance with claim 5 wherein the hydroperoxide is a hydrolyzed perester.

12. A method of accelerating the bonding of a pair of adjacent surfaces at ambient temperature comprising the steps of admixing with a polymerizable polyacrylate ester monomer; about .01–15.0 percent by weight of a hydroperoxide catalyst, said catalyst being characterized by its ability to remain ineffective to polymerize said monomer in the presence of oxygen and to initiate polymerization of said monomer in the absence of oxygen; 0.01–10.0 percent by weight of an organic sulfimide; a stabilizer selected from the group consisting of quinones and monohydric and dihydric phenols having at least one alkyl group ortho to each hydroxy group thereof; and an amine selected from the group consisting of heterocyclic secondary amines wherein the heterocyclic ring is hydrogenated, N,N-dialkyl aryl amines and N,N-dialkyl substituted aryl amines wherein the substituents are selected from the group consisting of lower alkyl radicals of 1 to 4 carbon atoms, the number of said substituents being at least two when one of said substituents is in the ortho position, said stabilizer and said amine being present in amounts equal to 10–1000 parts per million and 0.01–3.0 percent by weight, respectively, to thereby provide an anaerobic curing composition having extended shelf life in the presence of oxygen and being capable of rapidly polymerizing upon the exclusion of oxygen therefrom and depositing a portion of said anaerobic curing composition between the adjacent surfaces to the exclusion of oxygen.

13. A method of accelerating the bonding of a pair of adjacent surfaces at ambient temperature comprising the steps of admixing with a polymerizable polyacrylate ester monomer; about .01–15.0 percent by weight of a hydroperoxide catalyst, said catalyst being characterized by its ability to remain ineffective to polymerize said monomer in the presence of oxygen and to initiate polymerization of said monomer in the absence of oxygen; 0.01–10.0 percent by weight of an organic sulfimide, 10–1000 parts per million of a stabilizer selected from the group consisting of quinones and monohydric and dihydric phenols having at least one alkyl group ortho to each hydroxy group thereof; and 0.01–3.0 percent by weight of an amine corresponding to the general formula:

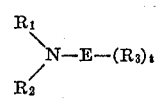

wherein E represents a carbocyclic aromatic nucleus selected from the group consisting of phenyl and naphthyl radicals, $R_1$ and $R_2$ are lower alkyl radicals of 1 to 4 carbon atoms inclusive, $t$ is one of the following: 0, an integer equal to from 1 to 5 inclusive, and $R_3$ is a member selected from the group consisting of lower alkyl radicals of 1 to 4 carbon atoms inclusive, provided that when an $R_3$ radical is in the ortho position $t$ is greater than one, to thereby provide an anaerobic curing composition having extended shelf life in the presence of oxygen and being capable of rapidly polymerizing upon the exclusion of oxygen therefrom and depositing a portion of said anaerobic curing composition between the adjacent surfaces to the exclusion of oxygen.

14. A method of acelerating the bonding of a pair of adjacent surfaces at ambient temperature comprising the steps of admixing with a polymerizable polyacrylate ester monomer; about .01–15.0 percent by weight of a hydroperoxide catalyst, said catalyst being characterized by its ability to remain ineffective to polymerize said monomer in the presence of oxygen and to initiate polymerization of said monomer in the absence of oxygen; 0.01–10.0 percent by weight of an organic sulfimide, a quinone in an amount equal to 10–1000 parts per million and 0.01–3.0 percent by weight of a heterocyclic secondary amine selected from the group consisting of pyrrolidine, piperazine and 1,2,3,4-tetrahydroquinoline, to thereby provide an anaerobic curing composition having extended shelf life in the presence of oxygen and being capable of rapidly polymerizing upon the exclusion of oxygen therefrom and depositing a portion of said anaerobic curing composition between the adjacent surfaces to the exclusion of oxygen.

15. A method of accelerating the bonding of a pair of adjacent surfaces at ambient temperature comprising the steps of admixing with a polymerizable polyacrylate ester monomer corresponding to the general formula:

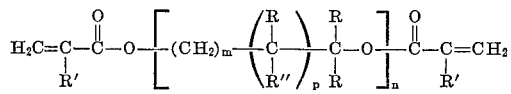

wherein R is a member selected from the group consisting of hydrogen, lower alkyl of 1–4 carbon atoms, hydroxy alkyl of 1–4 carbon atoms, and

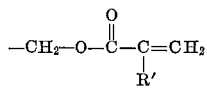

R' is a member selected from the group consisting of hydrogen, halogen, and lower alkyl of 1–4 carbon atoms, R" is a member selected from the group consisting of hydrogen, —OH and

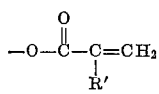

$m$ is an integer equal to at least 1, $n$ is an integer equal to at least 1 and $p$ is one of the following: 0,1; .01–15.0 percent by weight of a hydroperoxide catalyst, said catalyst being characterized by its ability to remain ineffective to polymerize said monomer in the presence of oxygen and to initiate polymerization of said monomer in the absence of oxygen; 0.01–10.0 percent by weight of an organic sulfimide; a stabilizer selected from the group consisting of quinones and monohydric and dihydric phenols having at least one alkyl group ortho to each hydroxy group thereof; and an amine selected from the group consisting of heterocyclic secondary amines wherein the heterocyclic ring is hydrogenated, N,N-dialkyl aryl amines and N,N-dialkyl substituted aryl amines wherein the substituents are selected from the group consisting of lower alkyl radicals of 1 to 4 carbon atoms, the number of said substituents being at least two when one of said substituents is in the ortho position, said stabilizer and said amine being present in amounts equal to 10–1000 parts per million and 0.01–3.0 percent by weight, respectively, to thereby provide an anaerobic curing composition having extended shelf life in the presence of oxygen and being capable of rapidly polymerizing upon the exclusion of oxygen therefrom and depositing a portion of said anaerobic curing composition between the adjacent surfaces to the exclusion of oxygen.

16. The method of claim 12 wherein the catalyst is an organic hydroperoxide.

17. The method of claim 12 wherein the amine is said N,N-dialkyl substituted aryl amine.

18. The method of claim 13 wherein the quinone is a benzoquinone and the integer $t$ in the formula of the amine is equal to one.

19. The method of claim 13 wherein the amine is N,N-dimethyl p-toluidine.

References Cited by the Examiner

UNITED STATES PATENTS

| | | | |
|---|---|---|---|
| 2,628,178 | 2/1953 | Burnett et al. | 161—194 |
| 3,041,322 | 6/1962 | Krieble | 260—89.5 |
| 3,043,820 | 7/1962 | Krieble | 260—89.5 |
| 3,046,262 | 7/1962 | Krieble | 260—89.5 |

JOSEPH L. SCHOFER, *Primary Examiner.*

DONALD E. CZAJA, *Examiner.*